Feb. 28, 1933.  A. E. RUTTER  1,899,361
HAYRAKE
Filed Oct. 9, 1931
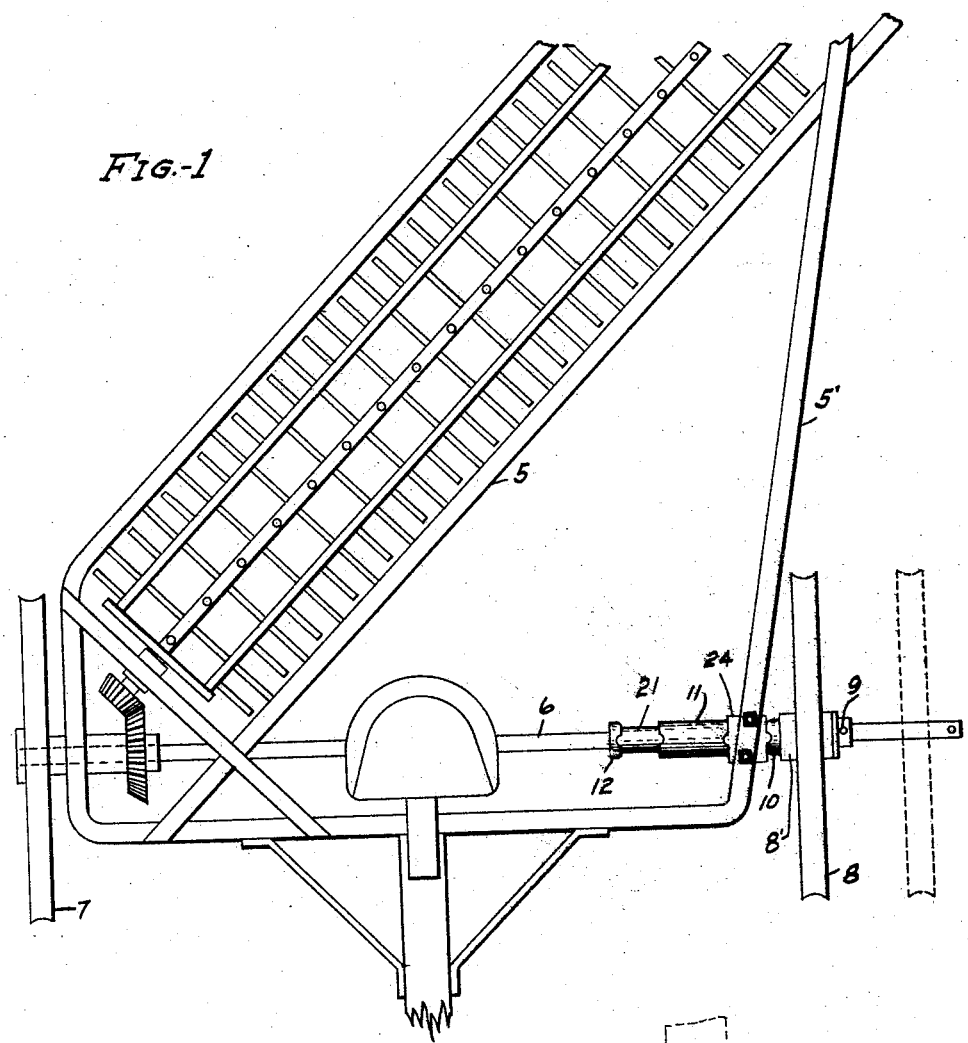
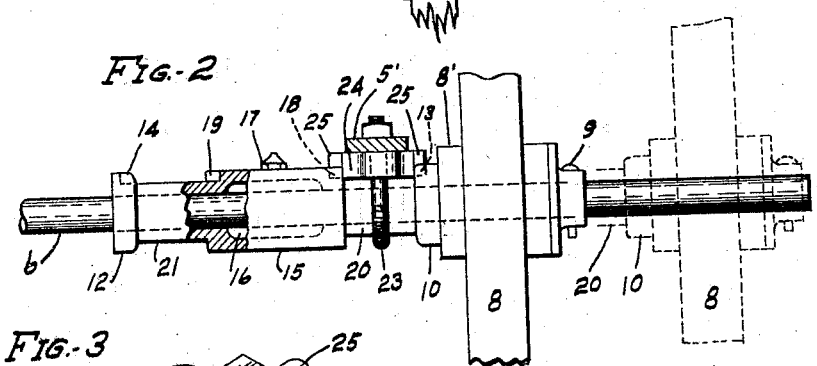
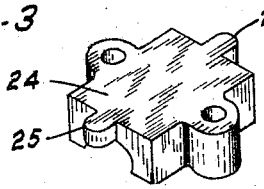
INVENTOR.
ALVAH E. RUTTER
BY James A. Walsh
ATTORNEY Patented Feb. 28, 1933

1,899,361

UNITED STATES PATENT OFFICE

ALVAH E. RUTTER, OF ROCKFORD, ILLINOIS, ASSIGNOR TO J. I. CASE COMPANY, OF RACINE, WISCONSIN, A CORPORATION

HAYRAKE

Application filed October 9, 1931. Serial No. 567,856.

My invention relates to improvements in hay rakes by which such implements may be readily adapted for raking viney crops, such as beans, peas and the like, the vines of which spread between the rows, and which I am enabled to effectively gather by the predeterminate positioning of a forward wheel of the rake along the outer end of the axle in such relation to the opposite wheel that both will travel between the rows, whereby I provide a varied wheel spacing for maintaining the rake wheels off crops planted in rows, and which may be readily accomplished in a simple manner.

In the accompanying drawing, forming part hereof, Figure 1 is a fragmentary plan of a hay rake showing its forward wheels in normal relation for raking hay; Fig. 2, a detail section showing one of the wheels in dotted lines extended for traveling between rows and raking vines, and Fig. 3 is a perspective of a bearing block which I employ in assembling the axle and parts associated therewith.

In said drawing the numeral 5 indicates the rake, 6 the axle, and 7, 8, the forward wheels thereof, and as the general construction of the rake may be of any desired arrangement and assemblage it is sufficient to describe in detail only the parts embodying my improvement and incidentally those directly associated therewith.

In carrying out my improvement I provide an axle which extends beyond or to the left-hand side of the rake frame 5'. The wheel 8, of any desired construction, is mounted on said axle and held by a pin 9 or otherwise. The wheel-hub 8' abuts against a head 10 of a sleeve or spacer 11, Fig. 1, the opposite end of the spacer being provided with a similar head 12, each of said heads embodying a notch, 13, 14, for a purpose to appear. Said spacer also includes an enlargement 15, Fig. 2, which is interiorly recessed, at 16, to form a chamber about the axle 6 in which to introduce a lubricant through a fitting, as 17, the upper side of said enlargement being also provided with notches 18, 19, similar to those in the heads, and which enlargement and heads produce recessed portions 20, 21, of the spacer near each of its ends. When assembled for hay raking the wheel 8, spacer 11, Fig. 1, and parts associated therewith are in the relation shown in full lines in Fig. 2, the frame member 5' and spacer being secured by a U bolt 23 passing through a bearing plate 24 having lugs 25 thereon which fit into the notches 13 and 18 of the head 10 and enlargement 15 respectively, and by which the bearing plate 24 and U bolt 23 are prevented from turning about the axle. When it is desired to convert the implement into a vine rake the wheel 8 is transposed to the outer end of the axle 6, as indicated in dotted lines in Fig. 2, and the U bolt 23 loosened or removed so that the lugs of the bearing plate will be disengaged from the notches 13 and 18 in the head and enlargement 15 of the spacer, whereupon the spacer may be moved outwardly along the axle so that its head 10 will abut against the hub 8' of the wheel as before. As the spacer is thus adjusted the reduced portion 21 thereof will occupy the same position in relation to the bearing plate 24 and U bolt 23 as the reduced portion 20 before being moved so that the notch 14 in head 12 and the notch 19 in enlargement 15 will be in registry with the lugs of the bearing plate when the frame 5', bearing plate and spacer 11 may be fixedly secured together by tightening the U bolt. By the simply applied devices disclosed it will be seen that the adjustment of the wheel 8 for either hay or vine raking may be readily accomplished in a simple and effective manner, and it will be also understood that the formation of the spacer at each end is identically the same so that it may be applied conveniently without especial selection or positioning as to either of its ends which may be interchangeably employed. The advantage and importance of spacing means constructed and applied substantially as disclosed will be apparent when it is understood that the axle, as 6, of an implement frequently breaks or becomes distorted under its load, and more especially at the outer end when the wheel has been transferred to the position shown in dotted lines. My improved spacer constructed as disclosed, embodying a sleeve having an enlarged portion, and a binder, not only acts to secure the wheel in adjusted position but also serves as a bearing and support, relieving the axle by carrying the implement load, and therefore obviates the deflection and breakage of the axle referred to.

I claim as my invention:

1. In a hay rake having an axle extending beyond its frame, a movable wheel thereon, an elongated spacer having a bore therein adjustably mounted on the axle and abutting the wheel, a bearing plate engaging the spacer to prevent the turning thereof on the axle, and means for securing the rake frame, bearing plate and spacer together on the axle.

2. In a hay rake having an axle, a wheel thereon, a tubular spacer mounted on the axle abutting the wheel, said spacer comprising heads and reduced portions at each of its ends and an enlarged portion in its midde, a bearing plate adapted to engage the reduced portions of the spacer, and means for securing the rake frame, bearing plate and spacer together on the axle.

3. In a hay rake having an axle, a wheel movably mounted thereon, a spacer comprising an elongated member having a bore therethrough and positioned on the axle, said spacer having notched heads at each end thereof and a notched body portion intermediate said heads, a bearing plate having means for engaging said notches when the spacer and wheel are in hay raking position and for also engaging said notches when the spacer and wheel have been transposed to vine raking position, and means for securing the rake frame, bearing plate and spacer together.

4. In a hay rake having an axle, a movable spacer positioned thereon embodying a member having heads and an intermediate enlarged portion, means engaging the spacer for preventing it from turning on the axle, and means for securing the engaging means and spacer together.

5. In a hay rake having an axle, a movable spacer positioned on the axle comprising a member having heads and an intermediate enlarged portion embodying a lubricant chamber, said heads and enlarged portion having notches therein, fastening means having lugs engaging said notches for preventing the spacer from turning, and means for securing said fastening means and spacer together.

6. In a hay rake having an axle, a wheel spacer adapted to be mounted on the axle and comprising a member having interchangeable reduced portions and heads at each of its ends, a single fastening means adapted to engage either of said reduced portions and heads for preventing turning of the spacer on the axle, and means for securing said fastening means and spacer together.

7. In an implement having an axle, a wheel thereon adapted to be adjusted toward and from its outer end, means for securing the wheel to the axle, a spacer mounted on the axle and abutting said wheel comprising a member embodying heads at each of its ends and an intermediate body portion having a notch therein, and means for engaging the notch to prevent turning of the spacer on the axle.

In testimony whereof I affix my signature.

ALVAH E. RUTTER.